Aug. 5, 1941.   E. D. COOK   2,251,608
TELEVISION PROJECTOR
Filed Feb. 29, 1940

Inventor:
Ellsworth D. Cook,
by Harry E. Dunham
His Attorney.

Patented Aug. 5, 1941

2,251,608

UNITED STATES PATENT OFFICE 2,251,608

TELEVISION PROJECTOR

Ellsworth D. Cook, Scotia, N. Y., assignor to General Electric Company, a corporation of New York Application February 29, 1940, Serial No. 321,493

1 Claim. (Cl. 178—7.1)

My invention relates to television apparatus and particularly to a television projector which is constructed and arranged to televise the successive pictures of a motion picture film. The object of my invention is the provision of an improved projector having means by which the illumination level of the picture transmitted by the projector is automatically controlled.

My invention will be better understood from the following description taken in connection with the accompanying drawing and its scope will be pointed out in the appended claim.

Figure 1:
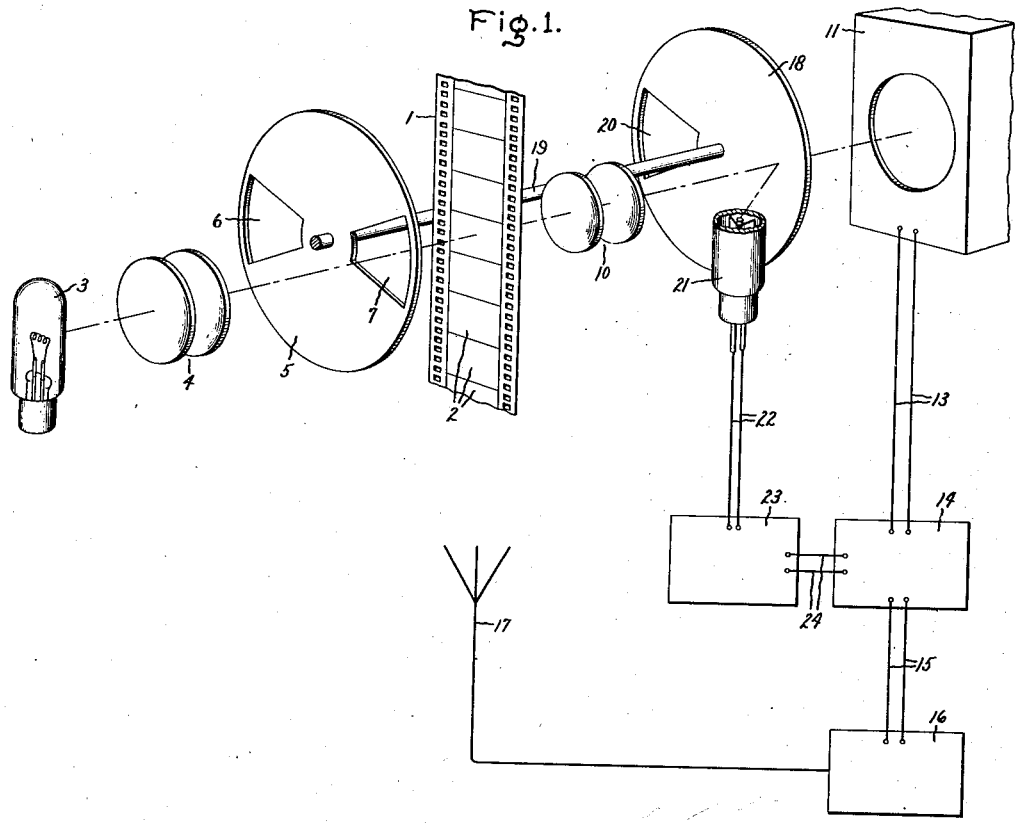
Figure 2:
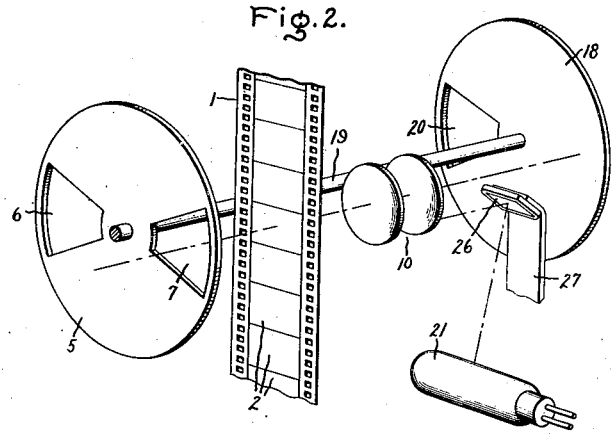

Referring to the drawing, Fig. 1 is a combined perspective view and circuit diagram of one embodiment of my invention and Fig. 2 is a similar view illustrating a modification.

In the drawing, I have chosen to show my invention as forming a part of a television projector of the type adapted for televising the successive pictures of a motion picture film. Such a film is represented at 1, the successive pictures or frames thereof being shown at 2. It will be understood that the projector is provided with suitable means, not shown, for moving the film through the projector in a well understood manner. The successive frames of the film are illuminated by light from a suitable source 3 such, for example, as an incandescent lamp, the light from which is projected onto the successive frames by the condenser 4. Arranged between the film and the condenser is the shutter 5 which in its simplest form is shown as having the opening 6 therein by which light may pass to the film to illuminate it during the period that an image of a frame thereof is to be produced on the television camera by the apparatus to be described later. I provide the shutter 5 with a second opening 7 shown as arranged opposite the first mentioned opening 6 in order to illuminate the film at other intervals intermediate the intervals at which images are produced on the camera.

Images of the successive frames of the film are produced by the objective 10 on a photoelectric screen in the television camera 11 which screen may, for example be the mosaic screen of a cathode ray transmitter tube. Inasmuch as the camera forms no part of my invention, its construction being well known in the art, it seems unnecessary to include a more detailed showing and description thereof. The camera 11 connects through the wires 13 with the amplifier 14 which in turn connects through the wire 15 with the television transmitter 16 having the antenna 17.

Arranged between the objective and the camera is the shutter 18 which in the exemplification illustrated is shown mounted on the same shaft 19 as the shutter 5 whereby the two shutters are driven in synchronism. The shutter 18 has the single opening 20 therein through which light is projected into the camera to form the image of each successive film frame. That face of the shutter 18 which is toward the light source and hence is illuminated thereby preferably is constructed to be highly reflecting, as for example, by coating the face with white paint. Arranged facing the shutter 18 to receive light reflected by it without interfering with the projected beam is the photoelectric device 21 which, for example, may be a photoelectric tube. The output of this tube is supplied by the wires 22 to the control amplifier 23 which connects by the wires 24 with the amplifier 14, the arrangement being such that the output of the photoelectric device 21 controls the amplitude of the video signal broadcast from the antenna 17. As a result of this construction the amount of light received by the photoelectric device is not merely that which passes through some small part of the film frame being televised but rather is that which is proportional to the average intensity of the light passing through all parts of the frame. In other words, it is proportional to the average illumination of all portions of the image since the beam of light intercepted by the shutter and partially reflected thereby into the photoelectric device comprises the entire light which goes to make up the image.

In the modification illustrated by Fig. 2, I employ the mirror 26 which extends slightly into the light beam producing the image in the camera and is inclined to reflect the light of a small part of the beam into the photoelectric device 21. The mirror intercepts the light beam at a point thereof where no optical image exists. The mirror may be supported in any desired manner as for example by a bracket such as shown at 27. Since the mirror intercepts the beam at a point widely removed from the image plane the light which it reflects is proportional to the average light of all parts of the image.

What I claim as new and desire to secure by Letters Patent of the United States is:

In a television projector having a fixed screen and means including an objective for producing thereon a plurality of successive images from a motion picture film, a shutter arranged between said screen and said objective and constructed alternately to pass the image-forming light and to intercept it, said shutter having a reflecting surface facing said objective, and a photoelectric device arranged to receive light reflected from said surface.

ELLSWORTH D. COOK.